United States Patent [19]

Cattelani et al.

[11] 4,336,996
[45] Jun. 29, 1982

[54] VARIABLE-FOCAL-LENGTH OBJECTIVE AND AN OPTICAL SYSTEM EQUIPPED WITH OBJECTIVES OF THIS TYPE FOR THE PRODUCTION OF SPECIAL EFFECTS ON FILM

[76] Inventors: Claude Cattelani, 1, Square de la Mayenne, F-75017 Paris; Catherine Perichon, 5, Square de la Beauce, F-77100 Meaux/Beauval, both of France

[21] Appl. No.: 172,639

[22] Filed: Jul. 25, 1980

[30] Foreign Application Priority Data

Mar. 12, 1980 [FR] France .................................. 80 05519

[51] Int. Cl.³ .................. G03B 27/32; G03B 27/52; G02B 9/00; G02B 15/18
[52] U.S. Cl. ..................................... 355/39; 350/427; 355/43; 355/57

[58] Field of Search ................ 355/18, 21, 39, 40–43, 355/50, 51, 55–59; 350/423, 427, 469, 38; 352/85, 90

[56] References Cited

U.S. PATENT DOCUMENTS

| | | | |
|---|---|---|---|
| 3,481,666 | 12/1969 | Higuchi | 350/427 |
| 3,524,696 | 8/1970 | Higuchi | 350/427 |
| 4,017,161 | 4/1977 | Tsuji | 350/427 |
| 4,105,291 | 8/1978 | Tsuji | 350/427 |

Primary Examiner—Richard A. Wintercorn
Attorney, Agent, or Firm—Young & Thompson

[57] ABSTRACT

A variable-focal-length objective for equipping optical printers and caption stands for the production of special effects on films is constituted by four groups of lenses, namely a first convergent group of four lenses, a second divergent group of four lenses, a third convergent group of six lenses, and a fourth convergent group of two lenses, the first and third groups being coupled together and movable.

6 Claims, 8 Drawing Figures

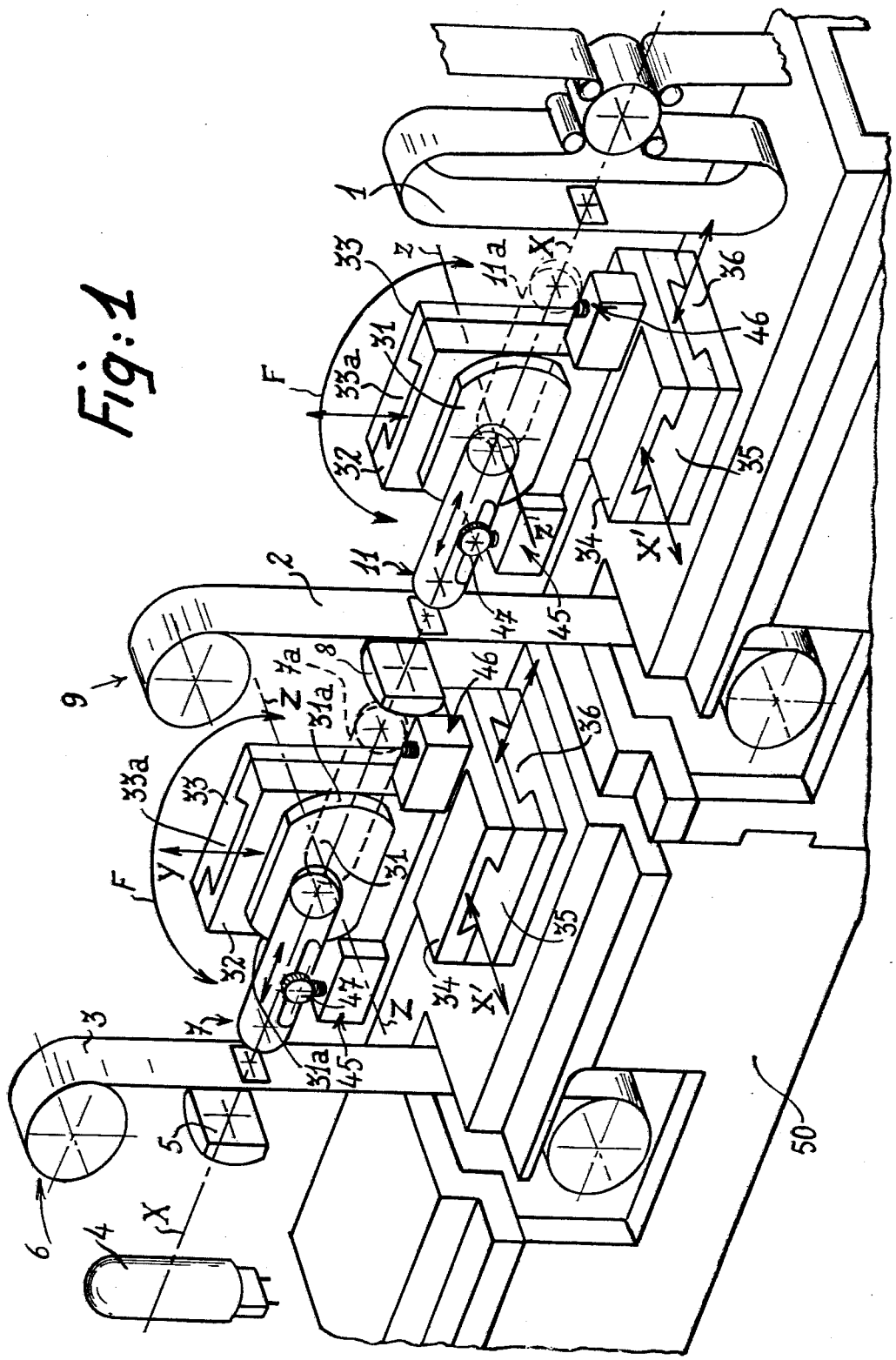

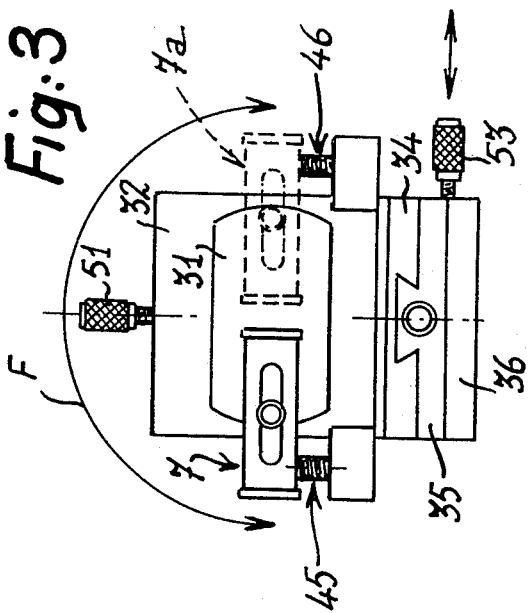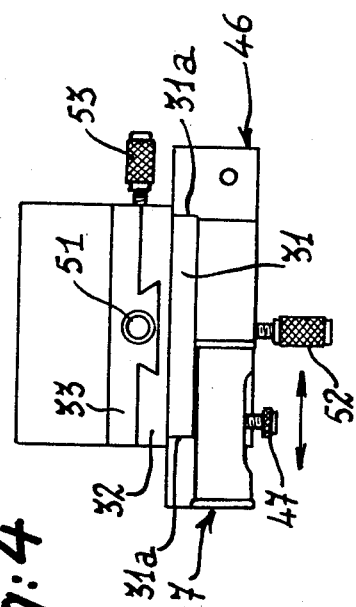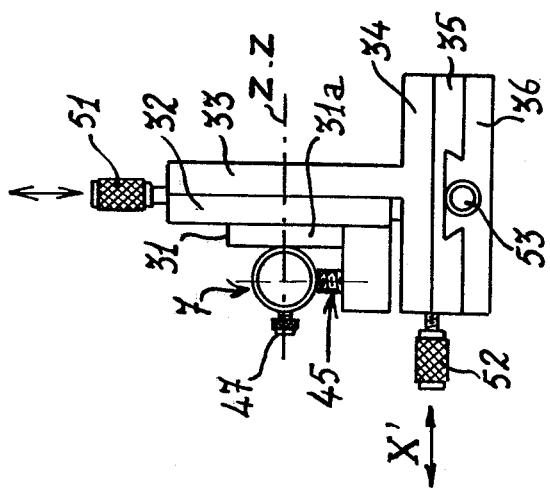

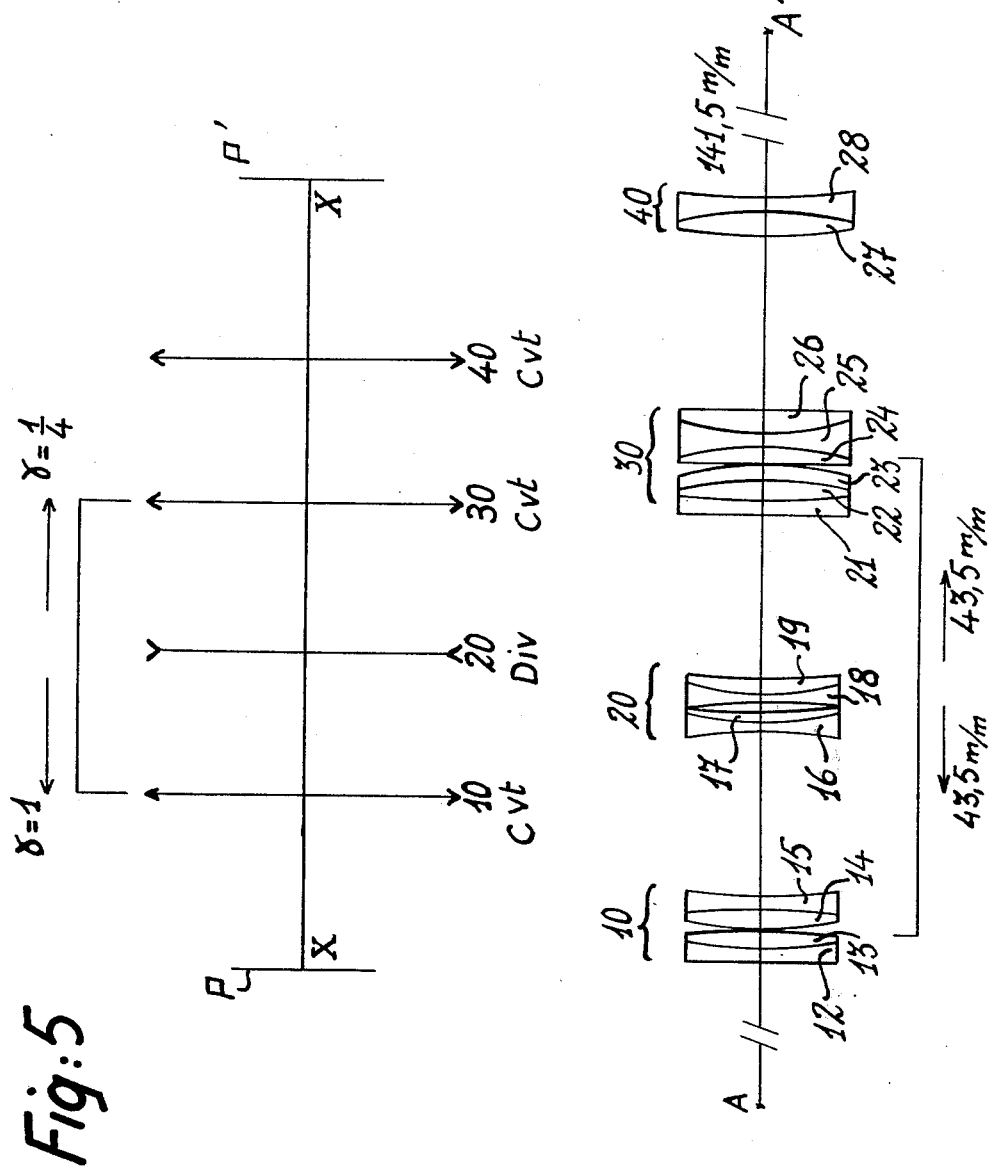

Fig: 7
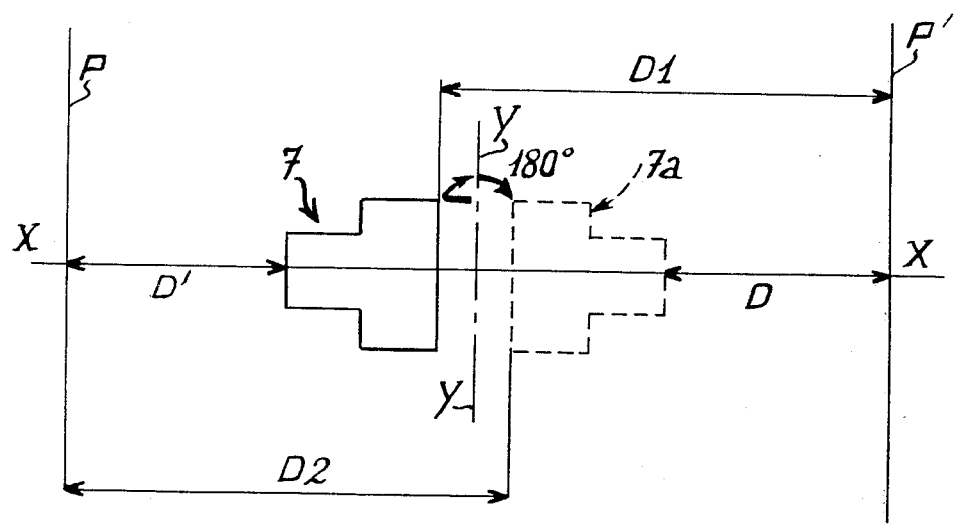

VARIABLE-FOCAL-LENGTH OBJECTIVE AND AN OPTICAL SYSTEM EQUIPPED WITH OBJECTIVES OF THIS TYPE FOR THE PRODUCTION OF SPECIAL EFFECTS ON FILM

This invention relates to a variable-focal-length objective as well as to optical systems equipped with said objective for producing special effects on unexposed films.

Optical systems designed for the production of special effects on an unexposed film by superimposing at least one previously exposed film on this latter are commonly designated as "optical printers" or as "caption stands", depending on whether the camera which unwinds the unexposed film and the objectives of the device move respectively in a horizontal or in a vertical direction. A fixed-focal-length objective is associated with each projector; an optical printer can thus comprise a main projector, an aerial-image projector and a beam-splitter projector for producing a 90° deviation with respect to the axis of the camera.

Known systems are equipped with a mechanical combination which makes it possible to displace the camera, camera objective and aerial projector objective as well as the projector in a horizontal direction in order to obtain either an enlargement or a reduction according to the direction of displacement, this being achieved while maintaining the focus on the plane of the unexposed film throughout the range of travel of the objective.

In the case of caption stands, the principle is the same; in this case, the camera dolly moves in the vertical direction and the plane of sharpness is located on the table of the stand.

However, it proves virtually impossible to eliminate the mechanical play which exists in optical systems of this type. In consequence, the focus does not remain constant and may be displaced either to the front or to the rear with respect to the plane of the unexposed film on which the films mounted on the projectors are to be combined. The aim of the invention is to overcome these disadvantages by replacing the fixed-focal-length objectives of conventional optical printers and caption stands by automatic-focusing varifocal objectives.

In accordance with the invention, the variable-focal-length objective which is intended to equip optical printers and caption stands for the production of special effects on films is constituted by four groups of lenses, viz:
  a first convergent group of four lenses,
  a second divergent group of four lenses,
  a third convergent group of six lenses,
  a fourth convergent group of two lenses,
the first and third groups being coupled together and movable.

This objective has a well-determined lens formula or silhouette, the numerical characteristics of which will be given in the following description.

The optical system for the production of special effects on an unexposed film, constituting an optical printer or a caption stand according as the movable elements undergo either a horizontal or a vertical displacement, comprises at least one objective associated with means for projecting at least one exposed film on the unexposed film with a view to obtaining the special effects.

In accordance with the invention, at least one of the aforesaid objectives is of the automatic-focusing varifocal type and has the characteristics mentioned in the foregoing.

According to another essential feature of the invention, the automatic-focusing varifocal objective which equips the optical system is pivotally mounted on an axis located at the midpoint between the object plane and the image plane and parallel to said planes so as to be capable of taking up two symmetrical positions with respect to said axis by reversal of said objective and so as to ensure that:
  when the objective is located between the axis aforesaid and the object, the magnification corresponding to the limits of displacement in translational motion of the first and third groups varies substantially between 1 and 4 and that
  when the objective is placed in its second position after reversal about the axis from the previous position, the reduction obtained by translational motion of the first and third groups varies substantially between 1 and 0.25.

In the case of a caption stand, the automaticfocusing varifocal objective provided by the invention makes it possible to obtain magnifications or reductions with a ratio of 1 to 20.

These and other features of the invention will be more apparent upon consideration of the following description and accompanying drawings in which two embodiments of the invention are shown by way of example but not in any limiting sense, and in which:

FIG. 1 is a simplified view in perspective showing a first embodiment of the invention constituted by an optical printer equipped with two variable-focal-length objectives in accordance with the invention;

FIG. 2 is a view in partial elevation along the optical axis of the optical printer of FIG. 1 and showing the assembly of a variable-focal-length objective;

FIG. 3 is a view in side elevation of the variable-focal-length objective of FIG. 2 together with its support;

FIG. 4 is an overhead plan view of the variable-focal-length objective of FIGS. 2 and 3 together with its support;

FIG. 5 is an optical diagram showing the design principle of the objective in accordance with the invention;

FIG. 6 is a diagram showing the elements constituting the different groups of lenses of the variable-focal-length objective in accordance with the invention;

FIG. 7 is an explanatory diagram showing the possibility of reversal of the variable-focal-length objective about an axis which is equidistant from the object and the image, in accordance with an essential feature of the invention;

Figure 8:
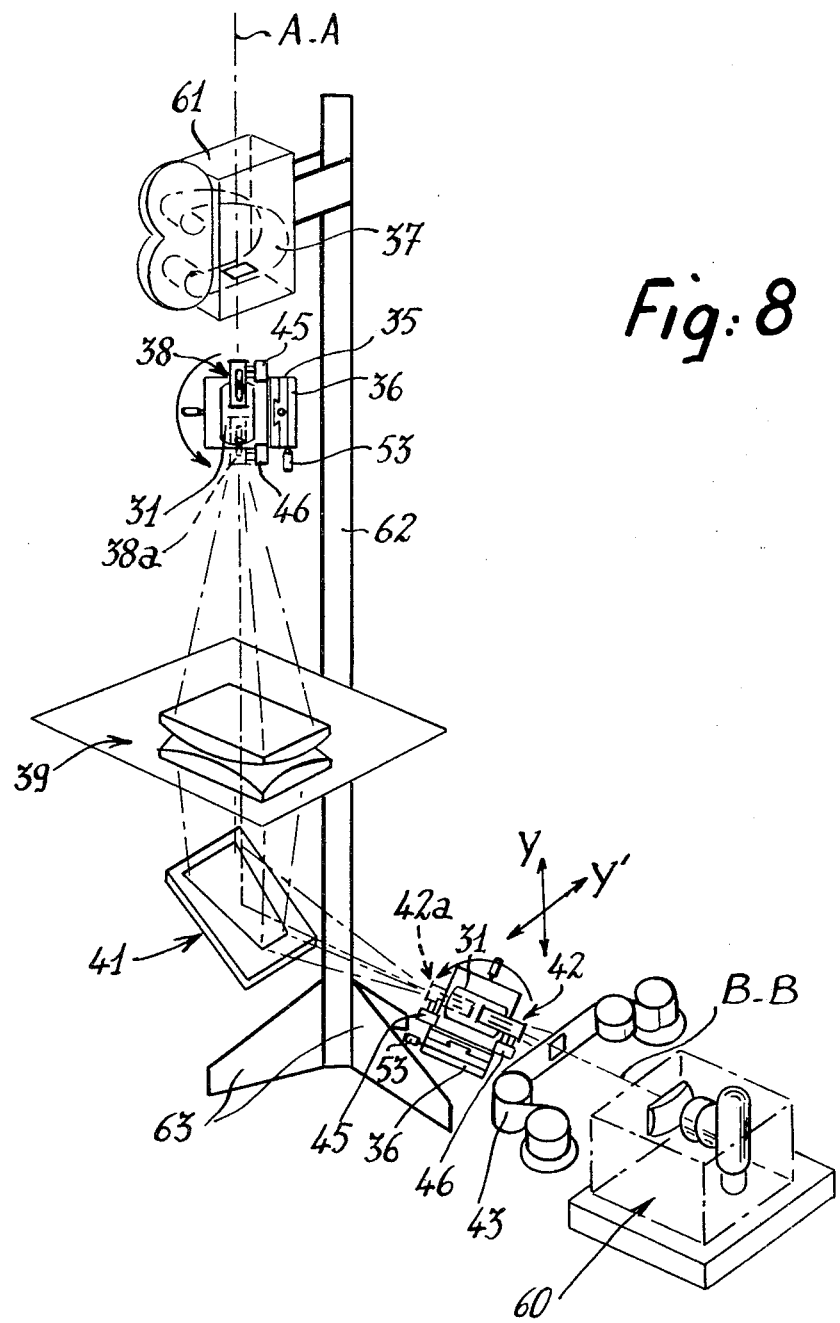
FIG. 8 is a schematic view in perspective showing a second embodiment of the invention in which the automatic-focusing varifocal objective serves to equip a caption stand.

The optical system shown diagrammatically in FIG. 1 is an optical printer or in other words a device for producing special effects on an exposed film 1 unwound by a camera (not shown), starting from a combination of two exposed films 2, 3 projected respectively by a main projector 9 and an aerial image projector 6.

Starting from the end remote from the film-unwinding camera 1, the device comprises in known manner a lamp 4, a condenser 5, the aerial image projector 6 which unwinds the film 3, a first objective 7, a condenser 8, the main projector 9 for projecting the second film 2, and a second objective 11. All these elements are mounted on a support frame 50 along a general optical axis X—X of the system.

The optical printer shown in FIG. 1 is equipped with two automatic-focusing varifocal objectives 7, 11 which are intended to permit enlargements or reductions of images which pass in front of the projectors 6, 9 within predetermined limits while maintaining the image obtained strictly in the plane of the unexposed film 1.

The objectives 7 and 11 are each rigidly fixed to a lateral shoe 31, said shoe being disposed vertically and rotatably mounted on a block 32 about a horizontal axis Z—Z which is perpendicular to the optical axis X—X.

The block 32 is in turn slidably mounted in a vertical plane parallel to the axis X—X, on a vertical plate 33. By way of example, the sliding connection between the plate 33 and the associated block 32 can be provided by an arrangement of the tenon and mortise type forming a dovetail assembly as illustrated in FIG. 1; this figure shows that the plate 33 is provided with a dovetail tenon 33a engaged within a corresponding mortise of the block 32.

The assembly constituted by the objective 7 (or 11) together with its support 32, 33 is in turn mounted on a solepiece 34 which is capable of sliding on a base 35 along an axis X' parallel to the axis Z—Z. Finally, the base 35 is also slidably mounted on a solepiece 36 for displacement along the optical axis X—X. The sliding connections between on the one hand the solepiece 36 and the base 35 and on the other hand between this latter and the plate 34 are obtained by means of "tenon and mortise" assemblies of the dovetail type as in the case of the assembly formed by the plate 33 and the block 32.

All the displacements along the axis X—X, the axis X', the vertical axis Y of sliding motion of the block 32 can be adjusted by means of micrometer screws 51, 52, 53.

The horizontal axis Z—Z on which the shoe 31 carrying the objective 7, 11 is pivotally mounted is located at the midpoint between the object plane P (FIG. 5) and the image plane P' corresponding to the unexposed film 1 and is parallel to these planes. In consequence, and in accordance with an essential feature of the invention, a pivotal movement of the shoe 31 about the axis Z—Z and through a sector of 180 degrees as indicated by the arrows F in FIG. 1 makes it possible to reverse the objective 7 or 11 so as to cause this latter to take up a position 7a, 11a which is symmetrical with the previous position with respect to the axis Z—Z. It should also be noted that these positions 7a, 7 and 11a, 11 are also symmetrical in each case with respect to the corresponding vertical axis Y.

In the case of each objective 7, 11, the support is provided with two lateral stops 45, 46 having vertical rods and secured to the base of the block 32 on each side of the shoe 31. By means of said stops 45, 46, the horizontality of the objective 7 or 11 can be suitably adjusted in each of its two positions in which the objective is applied against either of the two rods. The opposite edges 31a of the shoe 31 are rounded so as to permit pivotal motion of this latter and of the objective (7, 11) between the stops 45, 46.

The possibility of reversal of the objective 7 (or 11) is shown diagrammatically in FIG. 7. Thus, in accordance with the invention, the objective is capable of assuming either of the two symmetrical positions with respect to the vertical axis Y—Y after a pivotal displacement about the horizontal axis Z—Z through an angle of 180 degrees. In position 7a, the distance D between the objective and the image plane D' is equal to the distance D' between the object plane P and the objective. Correlatively, the distance D1 between the objective 7 which is placed in the position shown in full outline and the image plane P' is equal to the distance D2 between the rear face of the objective after reversal at 7a and the object plane P. The objective 7, 11 has a lens formula or "silhouette" which will be described in detail hereinafter and the numerical values are as follows:

$$D1 = D2 = 355.05 \text{ mm}$$
$$D = D' = 141.5 \text{ mm}$$

The objective (7 or 11) will now be described with reference to FIGS. 5 and 6.

The objective 7 in accordance with the invention is constituted by four groups of lenses, viz:
- a first convergent group 10 of four lenses 12 to 15 (shown in detail in FIG. 6),
- a second divergent group 20 of four lenses 16 to 19,
- a third convergent group 30 of six lenses 21 to 26,
- a fourth convergent group 40 of two lenses 27, 28, the first and third groups 10, 30 being coupled together and movable.

The displacement of these coupled groups 10, 30 is effected by means of a micrometer knob 47 in a manner known per se, each group 10 and 30 being thus capable of moving over a distance of 43.5 mm. Given that P is the object plane and P' is the plane of the film 1, a displacement of the movable groups 10, 30 in the direction of the plane P produces an enlargement of the image in the plane P'. Conversely, a displacement of the groups of lenses 10, 30 towards the plane P' produces a reduction of the image.

In FIG. 6, the plane P corresponds to the point A and the point P' corresponds to the point A'.

The formula or "silhouette" of the automaticfocusing varifocal objective in accordance with the invention is given in the following table, in which:
- R is the radius of curvature of the successive faces of the lenses with a precision of 0.002 mm,
- E is the thickness of the lenses in millimeters with a precision of 0.1 mm,
- Nd is the refractive index of the lenses,
- NU ($\nu$) is a complementary characteristic of the lenses.

|  |  | R | E | Nd | NU |
|---|---|---|---|---|---|
|  | 1 | PLANE |  |  |  |
|  |  |  | 3.00000 | 1.696500 | 36.5 |
|  | 2 | 103.0000 |  |  |  |
|  |  |  | 6.00000 | 1.697000 | 56 |
|  | 3 | −202.4481 |  |  |  |
|  |  |  | 0.10000 | AIR |  |
| GROUP 1 | 4 | 109.0000 |  |  |  |
|  |  |  | 5.50000 | 1.697000 | 56 |
|  | 5 | −184.0000 |  |  |  |
|  |  |  | 0.05000 | AIR |  |
|  | 6 | −175.8000 |  |  |  |
|  |  |  | 3.00000 | 1.696500 | 36.5 |
|  | 7 | 264.6000 |  |  |  |
|  |  |  | 45.86100 | AIR |  |
|  | 8 | −102.2700 |  |  |  |
|  |  |  | 2.00000 | 1.464500 | 65.7 |
|  | 9 | 83.8300 |  |  |  |

-continued

| | | R | E | Nd | NU |
|---|---|---|---|---|---|
| | 10 | 163.9200 | 3.50000 | 1.740000 | 28.1 |
| GROUP 2 | 11 | −200.3200 | 1.50000 | AIR | |
| | 12 | 59.8200 | 2.00000 | 1.464500 | 65.7 |
| | 13 | 91.8607 | 3.50000 | 1.740000 | 28.1 |
| | | | 46.76600 | AIR | |
| | 14 | 1991.4000 | 3.00000 | 1.613099 | 44.4 |
| | 15 | 200.0000 | 6.00000 | 1.608750 | 59 |
| | 16 | −185.8000 | 0.10000 | AIR | |
| GROUP 3 | 17 | −212.8000 | 5.00000 | 1.608750 | 59 |
| | 18 | −91.9756 | 0.10000 | AIR | |
| | 19 | PLANE | 6.00000 | 1.608750 | 59 |
| | 20 | −65.0000 | 3.00000 | 1.613099 | 44.4 |
| | 21 | 65.0000 | 6.00000 | 1.608750 | 59 |
| | 22 | PLANE | 47.34500 | AIR | |
| | 23 | 93.2200 | 7.00000 | 1.603500 | 64 |
| GROUP 4 | 24 | −135.8300 | 0.50000 | AIR | |
| | 25 | −114.6300 | 3.00000 | 1.613099 | 44.4 |
| | 26 | 242.8000 | 141.53047 | AIR | |

When the objective has been placed in the position shown in full outline in FIG. 7, the displacement of the first and third groups of coupled lenses 10, 30 towards the left or in other words towards the object plane P produces an enlargement of the image in the plane P' which can vary between 1 and 4 approximately. After reversal of the objective 7 about the axis Z—Z through an angle of 180 degrees to the position 7a, the displacement of the groups of lenses 10, 30 by means of the knob 47 between the limits determined by the characteristics of the objective makes it possible to obtain a reduction of the image in a ratio which varies between 1 and 0.25.

The advantages of the objective and of the optical system equipped with said objective for the production of special effects (optical printer illustrated in FIG. 1 or caption stand) are as follows:

By virtue of the fact that the fixed-focal-length objective of cameras or projectors of optical printers or caption stands is replaced by the variable-focal-length objective in accordance with the invention, cameras or projectors equipped with this variable-focal-length objective can accordingly be allowed to remain stationary. It is in fact solely the focal length of the objective which gives rise to the phenomenon of reduction or enlargement of the desired field by undergoing a variation. This device therefore has an enormous advantage in that it permits complete elimination of play of mechanical parts which could not be suppressed in known systems of the prior art and produced differences in sharpness in the images obtained on the unexposed film. Elimination of mechanical parts and the consequent possibility of moving the cameras or the projectors also simplifies manufacture to a considerable extent and produces a correlative reduction in cost price of the optical system.

The ratio of extreme focal lengths is considerably reduced and permits better correction of aberrations.

Since the variable-focal-length objective in accordance with the invention is incorporated in a pivoting system of the type shown in FIG. 1, said objective can readily be rotated either in one direction or in the other in order to carry out reductions or enlargements of the image.

In the enlargement or reduction operations, it is not necessary to carry out any correction of diaphragm with the variable-focal-length objective in accordance with the invention. This dispenses with the need for the electromechanical or electronic light-compensating systems which are necessary in conventional systems by reason of the substantial displacements of the film plane and of the objective (increase and decrease as a function of the square of the distance).

The elimination of moving mechanical parts of known devices by installation of at least one variable-focal-length objective in a stationary system simplifies the manufacture of optical printers or caption stands and reduces their overall size to a very appreciable extent.

Finally, if the optical printer or the caption stand is equipped with an additive or subtractive lamphouse, the luminous flux of this latter is not modified during enlargement and reduction operations, which is not the case in a conventional system.

There is shown in a simplified manner in FIG. 8 a caption stand which can be equipped with two variable-focal-length objectives in accordance with the invention.

The system comprises: a first film 43 unwound by a projector 60, a variable-focal-length objective 42 on a pivoting system of similar design to the system shown in FIG. 1, a reflecting mirror 41 which reflects the luminous flux towards a condenser device 39 on which a document (not shown) is placed. The supports provided for the elements 39 and 41 are known per se and have therefore not been illustrated. This aerial image and the document aforesaid are re-taken by a variable-focal-length objective 38 mounted on a pivoting system which is similar to the system of FIG. 1. The resultant image is received by an unexposed film 37 unwound by a camera 61 secured in such a manner as to be adjustable for height to a vertical upright member 62 which is provided at its base with supporting fins 63.

The axis A—A of the objective 38 and of the condenser 39 is vertical whereas the axis B—B of the objective 42 and of the projector 50 which unwinds the film 43 is horizontal.

As shown in the figure, the supports provided for the objectives 42 and 38 are similar to those provided for the objectives 7 and 11 and are therefore designated by the same reference numerals. Correlatively, the objective 38 is capable of pivotal displacement about a horizontal axis at right angles to the shoe 31 and to the plane of FIG. 8 as well as to the vertical optical axis A—A in order to take up the position 38a shown in dashed outline. Similarly, the objective 42 is capable of pivotal displacement about a vertical axis at right angles to the horizontal optical axis B—B whilst the shoe 31 is capable of pivotal displacement about said vertical axis together with the objective 42.

The automatic-focusing varifocal objective contemplated by the invention makes it possible in the case of the caption stand of FIG. 8 to obtain enlargements or reductions with a ratio of 1 to 20.

The invention is not limited to the embodiments hereinabove described and can include a large number of alternative forms of construction. Thus it is apparent that, in the case of an optical printer or of a caption stand provided with two objectives, either or both of said objectives may be in accordance with the invention. It is also possible to produce a number of different combinations in which a plurality of objectives are employed either partly or wholly in accordance with the invention. The objectives can be mounted on pivoting systems of any suitable type which is equivalent to the device shown in the drawings.

What is claimed is:

1. A variable-focal-length objective which is intended to equip optical printers and caption stands for the production of special effects on films, wherein said objective is constituted by four groups of lenses, viz:
 a first convergent group of four lenses,
 a second divergent group of four lenses,
 a third convergent group of six lenses,
 a fourth convergent group of two lenses,
the first and third groups being coupled together and movable, and wherein said objective has the following lens formula in which:
 R is the radius of curvature of the successive faces of the lenses with a precision of 0.002 mm,
 E is the thickness of the lenses in millimeters with a precision of 0.1 mm,
 Nd is the refractive index of the lenses,
 NU ($\nu$) is a complementary characteristic of the lenses.

| | | R | E | Nd | NU |
|---|---|---|---|---|---|
| | 1 | PLANE | | | |
| | | | 3.00000 | 1.696500 | 36.5 |
| | 2 | 103.0000 | | | |
| | | | 6.00000 | 1.697000 | 56 |
| | 3 | −202.4481 | | | |
| | | | 0.10000 | AIR | |
| GROUP 1 | 4 | 109.0000 | | | |
| | | | 5.50000 | 1.697000 | 56 |
| | 5 | −184.0000 | | | |
| | | | 0.05000 | AIR | |
| | 6 | −175.8000 | | | |
| | | | 3.00000 | 1.696500 | 36.5 |
| | 7 | 264.6000 | | | |
| | | | 45.86100 | AIR | |
| | 8 | −102.2700 | | | |
| | | | 2.00000 | 1.464500 | 65.7 |
| | 9 | 83.8300 | | | |
| | | | 3.50000 | 1.740000 | 28.1 |
| | 10 | 163.9200 | | | |
| | | | 1.50000 | AIR | |
| GROUP 2 | 11 | −200.3200 | | | |
| | | | 2.00000 | 1.464500 | 65.7 |
| | 12 | 59.8200 | | | |
| | | | 3.50000 | 1.740000 | 28.1 |
| | 13 | 91.8607 | | | |
| | | | 46.76600 | AIR | |
| | 14 | 1991.4000 | | | |
| | | | 3.0000 | 1.613099 | 44.4 |
| | 15 | 200.0000 | | | |
| | | | 6.00000 | 1.608750 | 59 |
| | 16 | −185.8000 | | | |
| | | | 0.10000 | AIR | |
| GROUP 3 | 17 | −212.8000 | | | |
| | | | 5.00000 | 1.608750 | 59 |
| | 18 | −91.9756 | | | |

-continued

| | | R | E | Nd | NU |
|---|---|---|---|---|---|
| | | | 0.10000 | AIR | |
| | 19 | PLANE | | | |
| | | | 6.00000 | 1.608750 | 59 |
| | 20 | −65.0000 | | | |
| | | | 3.00000 | 1.613099 | 44.4 |
| | 21 | 65.0000 | | | |
| | | | 6.00000 | 1.608750 | 59 |
| | 22 | PLANE | | | |
| | | | 47.34500 | AIR | |
| | 23 | 93.2200 | | | |
| | | | 7.00000 | 1.603500 | 64 |
| GROUP 4 | 24 | −135.8300 | | | |
| | | | 0.50000 | AIR | |
| | 25 | −114.6300 | | | |
| | | | 3.00000 | 1.613099 | 44.4 |
| | 26 | 242.800 | | | |
| | | | 121.53047 | AIR. | |

2. An optical system for the production of special effects on an unexposed film, constituting an optical printer or caption stand and comprising at least one objective associated with means for projecting at least one exposed film on the unexposed film in order to obtain special effects, wherein at least one of the objectives is constituted by four groups of lenses, viz:
 a first convergent group of four lenses,
 a second divergent group of four lenses,
 a third convergent group of six lenses,
 a fourth convergent group of two lenses, the first and third groups being coupled together and movable.

3. An optical system according to claim 2, wherein said variable-focal-length objective is pivotally mounted on an axis located at the midpoint between the object plane and the image plane and parallel to said planes so as to be capable of taking up two symmetrical positions with respect to said axis by reversal of said objective, and wherein:
 when the objective is located between the axis aforesaid and the object, the magnification corresponding to the limits of displacement in translational motion of the first and third groups varies substantially between 1 and 4, and
 when the objective is placed in its second position after reversal about the axis from the previous position, the reduction obtained by translational motion of the first and third groups varies substantially between 1 and 0.25.

4. An optical system according to claim 3 in which the general optical axis is horizontal, wherein said system comprises means for producing a pivotal displacement of the variable-focal-length objective about a horizontal axis at right angles to the optical axis of the system in order to cause said system to take up successively two symmetrical positions with respect to said axis after reversal through an angle of 180 degrees.

5. An optical system according to claim 4, wherein the means for producing a pivotal displacement of the objective about the axis aforesaid comprise a vertical shoe mounted on a support block and rotatable about said axis, stops for adjusting the positions of the objective being placed on each side of said shoe.

6. An optical system according to claim 3, constituted by a caption stand comprising a projector having a horizontal optical axis which is capable of unwinding a first film, a mirror for reflecting the luminous flux to a condenser which is intended to receive a document, an unexposed film unwound by a camera located above the condenser and carried by a supporting element in such a manner as to ensure that the optical axis of said element and of the camera is vertical, and two variable-focal-length objectives, one objective being mounted between the projector and the reflector for pivotal displacement about a vertical axis at right angles to the horizontal optical axis, the other objective being placed between the condenser and the camera for pivotal displacement about a horizontal axis at right angles to the vertical optical axis.

* * * * *